(12) United States Patent
Kellermeier et al.

(10) Patent No.: US 8,031,114 B2
(45) Date of Patent: Oct. 4, 2011

(54) INFRASTRUCTURE AND METHOD FOR GEOGRAPHY BASED VEHICLE ALERT

(75) Inventors: Dirk Kellermeier, Weinolsheim (DE); Frank Lautenbach, Loerzweiler (DE); Simon Lorenz, Geisenheim (DE)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 12/392,291

(22) Filed: Feb. 25, 2009

(65) Prior Publication Data

US 2009/0243925 A1    Oct. 1, 2009

(51) Int. Cl.
*G01S 19/25*    (2010.01)
*G01S 3/02*    (2006.01)

(52) U.S. Cl. .................................. 342/357.64; 342/457
(58) Field of Classification Search ............. 342/357.25, 342/357.43, 357.64, 450, 457
See application file for complete search history.

(56) References Cited

U.S. PATENT DOCUMENTS

| 2003/0190911 A1* | 10/2003 | Hirano ........................... 455/423 |
| 2009/0164118 A1* | 6/2009 | Breen ........................... 701/207 |
| 2010/0088163 A1* | 4/2010 | Davidson et al. ................ 705/11 |
| 2010/0127919 A1* | 5/2010 | Curran et al. ............. 342/357.07 |

* cited by examiner

*Primary Examiner* — Dao L Phan
(74) *Attorney, Agent, or Firm* — Rainieri G. Ventura; James R. Nock

(57) ABSTRACT

With the present invention a cost effective infrastructure for geofencing of vehicles is provided which is able to monitor a large amount of complex geofences. In addition, a reliable method for geofencing of vehicles in real-time is provided.

14 Claims, 3 Drawing Sheets

INFRASTRUCTURE AND METHOD FOR GEOGRAPHY BASED VEHICLE ALERT

BACKGROUND OF THE INVENTION

1. Field of the Invention

In general, the present invention relates to geofencing of vehicles by means of telematics. More particular, the present invention relates to an infrastructure comprising means for monitoring a vehicle's geographical position, means for storing geofence data, means for comparing the vehicle's position with said geofence data to determine geofence violation, and means to trigger a predefined action in case of geofence violation. Besides, the present invention relates to a corresponding method for geofencing of vehicles.

2. Description of the Related Art

Geofencing of vehicles means restricting the allowed movement of a vehicle to or within a specified area. There is a growing demand for low-priced but effective implementations of geofencing for different applications. For instance, car rental agencies and leasing car companies use geofencing as vehicle theft protection. In this case the country boarders e.g., of the European Union may be defined as geofences. Other potential users are fleet operators, airports and airport fleet operators which improve their logistics by the help of geofencing. Here, the borders of the company site may be provided as geofences. Yet another important application for geofencing is supervising the transport of assets with value, like money cash transports or delivery vans for medical equipment, medicine, blood, etc. In this case the geofences may define a routing corridor the vehicle must follow. As mentioned before, the particular applications of geofencing vary in the predefined set of geofences, on the one hand. On the other hand, these applications may vary in the predefined actions in case of geofence violation. So, one triggered action may be generating an alarm or, in case of geofencing as vehicle theft protection or supervising the transport of assets with value, even immobilizing the vehicle.

To realize geofencing of a vehicle, this vehicle's geographical position has to be monitored and compared to the geofence data of the specific application.

It is well known in the art to equip vehicles with a GPS receiver for monitoring the vehicle's geographical position. Besides this onboard unit, the vehicle's telematics device provides a processor and a RAM memory. For reasons of cost optimization the processor is usually very resource constrained and the RAM memory is also very limited. As geofence violation detection requires an amount of processing power and RAM memory exceeding the possibilities of the standard telematics equipment of most vehicles, it is usually processed on a backend system. Therefore, the vehicle's telematics device collects and stores position data on the device. This data is transmitted to the backend system in regular intervals, where it is processed for geofence monitoring. This strategy causes an immense data traffic and consequently, a huge amount of telecommunication costs. Besides, this geofence violation detection can not be performed in real-time. The cost optimized telematics devices installed in most vehicles only allow the monitoring of very few and very simple geofences onboard and in real-time.

To summarize the section above, cost optimized telematics devices, as usually installed in vehicles, do not provide an acceptable solution for monitoring a noteworthy amount of very complex geofences in real-time, as it is asked for by most clients. Thus, the present invention provides a cost effective onboard infrastructure for geofencing of vehicles which is able to monitor a large amount of complex geofences. The present invention also provides a reliable method for geofencing of vehicles in real-time.

BRIEF SUMMARY OF THE INVENTION

The foregoing objectives are achieved by an infrastructure and a method as laid out in the independent claims. Further advantageous embodiments of the present invention are described in the subclaims and are taught in the following description.

According to the present invention the claimed infrastructure comprises:
means for monitoring a vehicle's geographical position;
means for storing geofence data;
means for comparing the vehicle's position with said geofence data to determine geofence violation; and
means to trigger a predefined action in case of geofence violation.

Said infrastructure is characterized by
means for defining geographical subregions;
means for subdividing said geofence data into sub-geofences matching said geographical subregions and for generating association information associating said sub-geofences to the corresponding geographical subregion;
a first storage device for keeping all sub-geofence data and association information;
a second storage device for keeping association information and the sub-geofence data of at least one selected geographical subregion;
means for locating the vehicle in one of said geographical subregions on the base of its geographical position and said definition of geographical subregions; and
means for restricting the determination of a geofence violation to a comparison of the vehicle's position with the sub-geofence data of the thus identified geographical subregion.

Accordingly the claimed method comprises:
monitoring of the vehicle's geographical position;
comparing the vehicle's position with geofence data to determine geofence violation; and
triggering a predefined action in case of geofence violation.
Said method is characterized by:
defining geographical subregions;
subdividing said geofence data into sub-geofences matching said geographical subregions;
generating association information associating said sub-geofences to the corresponding geographical subregions;
locating the vehicle in one of said geographical subregions on the base of its geographical position and said definition of geographical subregions; and
restricting the determination of a geofence violation to a comparison of the vehicle's position with the corresponding geofence data of the thus identified geographical subregion.

The present invention takes advantage of the fact, that vehicles can only move continuously within the geographical area covered by the geofence data of a given application. In other words, a vehicle driving through the south of a country is not able to violate a geofence in the north of said country. Therefore, in most cases not all geofences have to be considered during geofence violation detection. In fact, if it is possible to locate a vehicle in a subregion of the whole geofence area, only the geofence data of this subregion has to be checked. This strategy reduces the amount of data processing and processing time significantly, thus allowing even complex geofence monitoring on resource constraint telematics devices.

In this context, the present invention proposes to extend such a standard telematics device with a comparatively cheap storage device, like an SD-card. According to the invention this storage device is used for storing all geofence data of the specific application subdivided into sub-geofence data together with association information associating said sub-geofences to predefined geographical subregions of the whole geofence area. As outlined above, the geofences to be monitored are application specific and may vary depending on the usage and user of the vehicle. Considering this case, the present invention allows to easily convert the telematics device by changing said additional storage device and thus providing the specific geofence data and association information of the desired application.

In a preferred embodiment of the present invention an off-line compiler is provided for generating the sub-geofence data and corresponding association information of a given application and for storing these data structures on a separate storage device. This is done once, before connecting said storage device to the telematics device. Therefore, said off-line compiler has to define geographical subregions of the whole geofence area. Then, the whole geofence data is subdivided into sub-geofences matching said geographical subregions. Finally, said sub-geofences are associated to the corresponding geographical subregion. The resulting data structures—sub-geofence data together with the corresponding association information—is finally stored on said additional first storage device. This may be a non volatile memory like an SD-card.

The association information comprising the definition of said geographical subregions and the sub-geofence data of at least one selected geographical subregion are stored in a working memory as second storage device and, preferably, this data is stored in the RAM memory of the vehicle's existing telematics device, as it is starting point for the infrastructure proposed by the present invention.

It is of further advantage, if both storage devices are accessible by a μ-controller, again preferably the μ-controller of the vehicle's existing telematics device. This μ-controller has to access:

said second storage device for identifying those sub-geofences which are associated with the geographical subregion, where the vehicle has been located, said first and second storage device (4, 2) for loading said identified sub-geofence data from said first storage device into said second storage device, and said second storage device for comparing the vehicle's position with the said identified sub-geofence data.

As mentioned before, the claimed method for geofencing of vehicles is based on dividing the whole geofence region of a given application into a set of subregions. Obviously, there are various possibilities to define these subregions and to subdivide the geofence data accordingly. In a preferred embodiment of the present invention the geofence data is subdivided according to a tile map representing the subregions of the whole geofence area. In this case, the vehicle is first located in one of the tiles by comparing the determined geographical position of the vehicle with the tile definitions. Then, only the sub-geofence data of the thus identified tile is compared to the vehicle's geographical position to detect geofence violation.

The amount of association information depends on the number of tiles. Therefore, especially in case of very small meshed tile maps, it is advantageous to group the tile map association information according to geographically linked subsets of tiles of said tile map. Then, it is possible to reduce the required amount of working memory capacity by loading only a group of association information into this storage device depending on the geographical subregion where the vehicle has been located.

BRIEF DESCRIPTION OF THE SEVERAL VIEWS OF THE DRAWINGS

The novel features of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

DETAILED DESCRIPTION OF THE INVENTION

Figure 1:
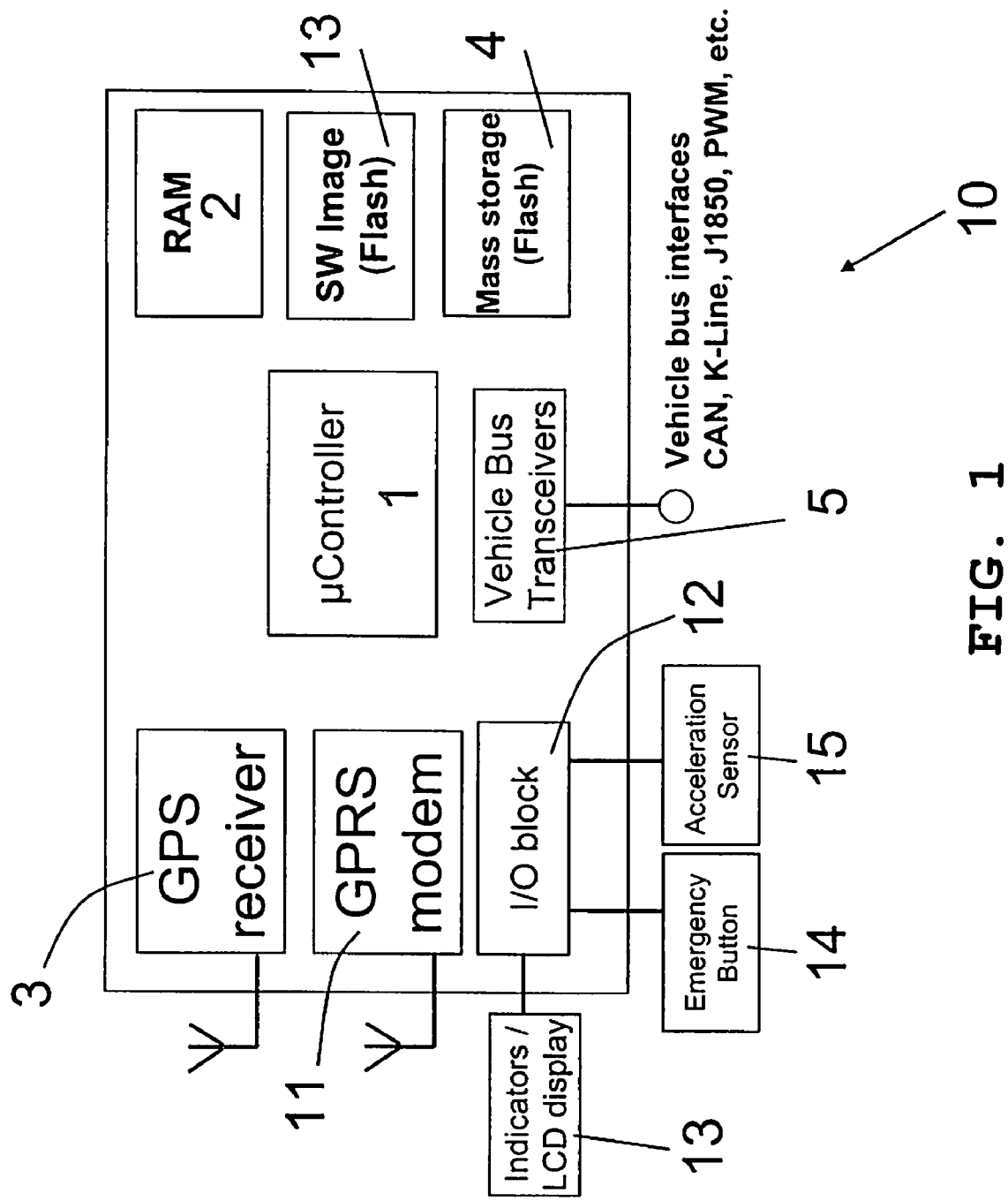
FIG. 1 shows a diagram of an onboard unit for telematics applications being part of an infrastructure according to the present invention.

FIG. 1 illustrates the typical configuration of an onboard unit 10 for telematics applications as it is installed in many vehicles and as it is starting point for the infrastructure proposed by the present invention.

Said onboard unit 10 comprises a μ-controller 1 and a RAM memory 2 to record and store position data via a GPS receiver 3 as well as vehicle related data, gathered via the vehicle bus interfaces and transceivers 5.

Onboard unit 10 performs the geofence monitoring autonomously. In case of geofence violation it either sends an alarm to a connected gateway to the Internet or to a backend system for further processing or it triggers some action within the vehicle, like activating the vehicles horn or an immobilizer.

As further standard components onboard unit 10 comprises a GPRS modem 11, an I/O block 12 with indicators/LCD display 13, emergency button 14 and acceleration sensor 15 and a software image on storage device 16.

Such an onboard unit 10 is typically cost optimized. Consequently, its components are resource constraint, especially μ-controller 1 and RAM memory 2, which are the critical components regarding processing power and capacity. Accordingly, an ARM7 processor is typically used as μ-controller 1 and RAM memory 2 provides typically 256 kB.

Figure 2:
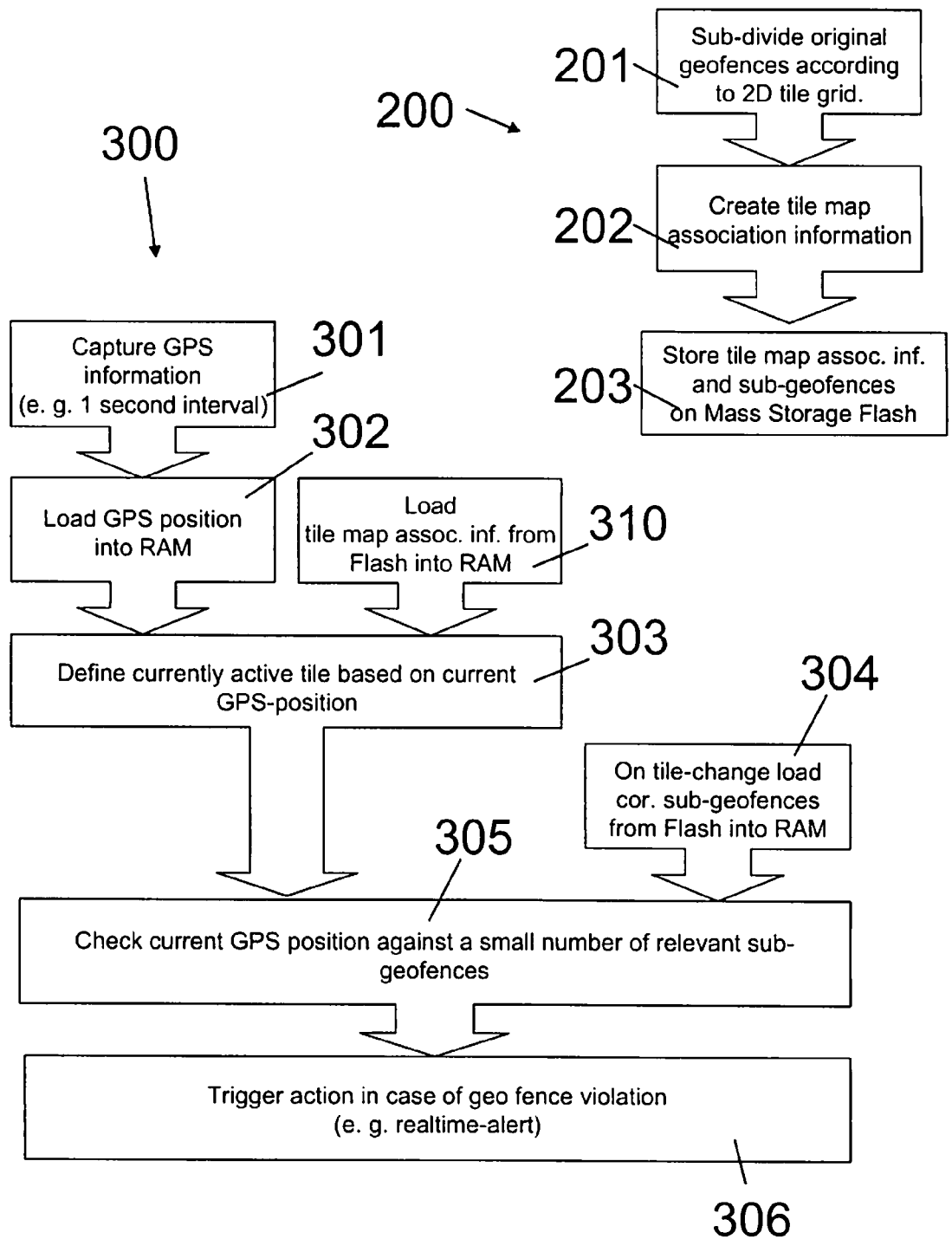
FIG. 2 shows a diagram illustrating a method for geofencing of vehicles according to the present invention.

According to the invention, this kind of onboard unit 10 is equipped with an additional storage device 4, which is a non volatile memory, like an SD-card. This additional storage device 4 is used for keeping all sub-geofence data of a given application together with association information. The meaning of this association information is explained in detail together with the proposed method for geofencing in connection with FIG. 2.

Besides the components 1 to 4 of the onboard unit 10 the infrastructure of the present invention comprises means:

for defining geographical subregions of the whole area covered by the geofence data of a given application, for subdividing said geofence data into sub-geofences matching said geographical subregions, and for generating association information associating said sub-geofences to the corresponding geographical subregions.

This may be done by an off-line compiler, which is not represented in FIG. 1 because it is usually not located in the onboard unit installed in a vehicle.

This off-line compiler is only used for preparing the geofence data of a given application and to store the resulting data structures on the storage devices 4, 2 of the onboard unit 10. This is illustrated by the flowchart of an off-line compilation procedure 200 in the upper part of FIG. 2 on the right side.

Figure 3:
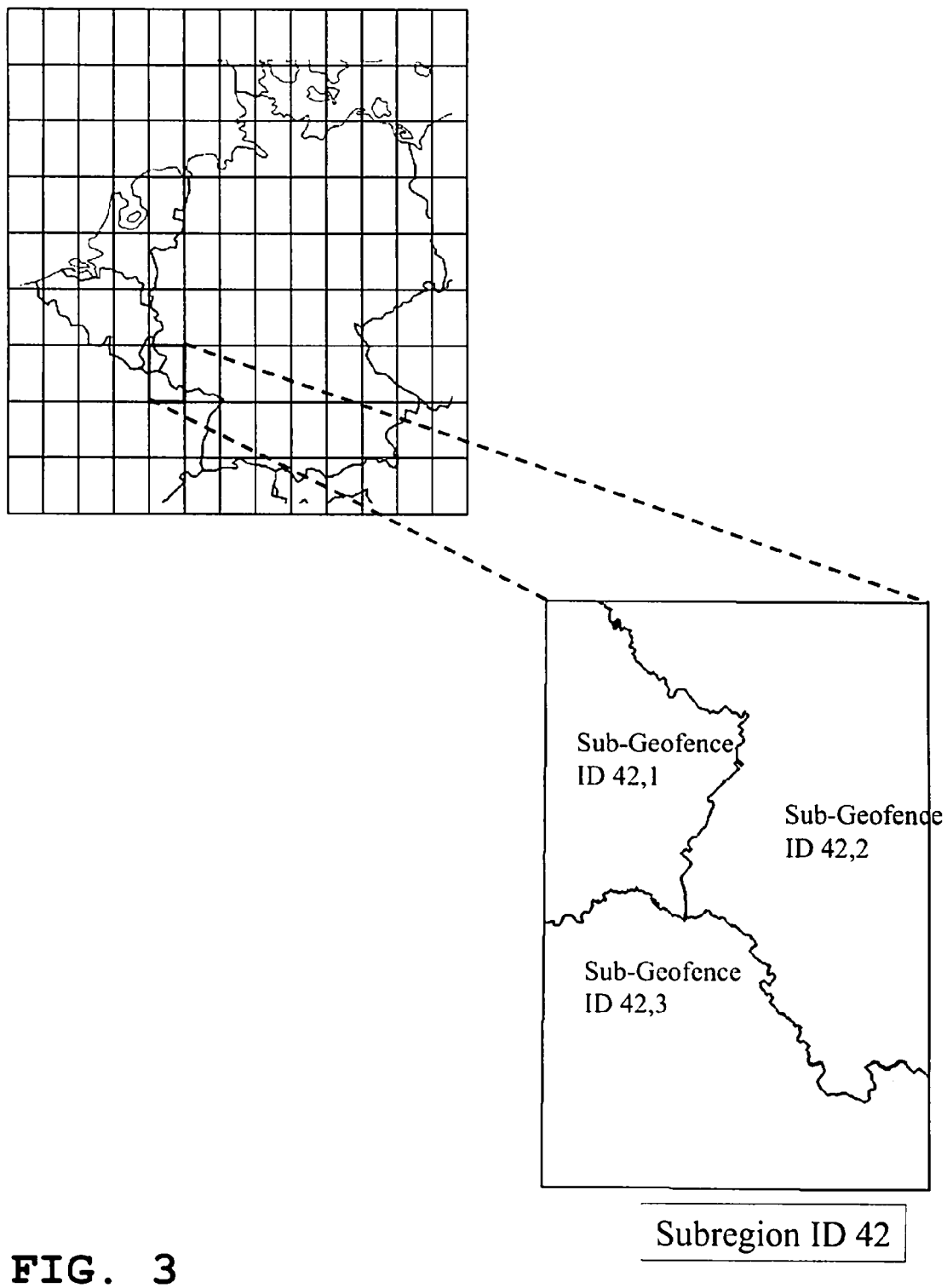
FIG. 3 shows a tile map of a geofence area together with one enlarged tile illustrating the subdivision of the geofence data into sub-geofences matching the corresponding subregion as proposed by the present invention.

In a first step 201 of this compilation procedure 200 all original geofences are subdivided by a 2D tile grid resulting in a set of sub-geofences for each tile representing the congruent area between the original geofences and the respective tile. This is illustrated by FIG. 3. In a second step 202 this sub-geofence data is classified by associating all sub-geofences to its corresponding tiles. By that, tile map association information is created. As final step 203 of procedure 200 the sub-geofence data together with the tile map association information is stored on storage device 4. This compilation procedure has to be carried out once, before the actual geofence monitoring.

In the described embodiment the tile map association information, i.e., the definition of associations between geographical tiles and its corresponding sub-geofences, is loaded from the storage device 4 into RAM memory 2 in step 310. This is another requirement for the geofence monitoring described herein after.

The first step 301 of the here described geofence violation detection procedure 300 is monitoring of the vehicle's geographical position. Therefore, GPS information is continuously captured with GPS receiver 3, e.g., in intervals of 1 s. The determined current GPS position is loaded into RAM memory 2 in step 302.

The next step 303 of procedure 300 is locating the vehicle in one of the geographical subregions (here: tiles) defined before. In our case this means, the currently active tile is determined based on the current GPS position. This is done by μ-controller 1 accessing RAM memory 2 to compare the current GPS position to the definition of the tile map.

Having determined the active tile, μ-controller 1 checks whether the corresponding sub-geofence data is available in RAM memory 2. If not, this sub-geofence data is loaded from storage device 4 into RAM memory 2 in step 304. As the capacity of RAM memory 2 is very limited, only the corresponding sub-geofence data of one subregion is stored here per time. This means, when loading new sub-geofence data the residing sub-geofence data is overwritten.

Then, the current GPS position is compared to the sub-geofence data of the active tile, which is supposed to comprise only the geofences likely to be violated. Again, this comparison is carried out by μ-controller 1 accessing RAM memory 2. As, the determination of geofence violation in step 305 is restricted to a comparison of the vehicle's position with the sub-geofence data of a single subregion, comprising only a relatively small number of geofences, a tremendous amount of processing power is saved.

If a geofence violation is detected in step 305, a predefined action, such as a real-time alert, is triggered in step 306.

The example described above illustrates the main idea of the invention.

An off-line compiler prepares the data structures to be stored in storage device 4. This off-line process divides the original geofence areas, e.g., representing the borders of European countries, into a tile map, e.g., one tile per full degree in longitude and latitude. In addition, this area can be cleaved into subregions spanning multiple tiles. Also, the tiles can be further divided.

Instead of keeping all geofence data in RAM memory 2 at the same time, the current GPS position determines which tile is currently active. Only sub-geofences being located within the currently active tile need to be checked and are therefore loaded into RAM memory 2. According to the invention, the only data that needs to be kept in RAM memory 2 is the tile map association information defining the tile regions to identify the currently active tile on the base of the current GPS position and associating the sub-geofences to each tile. In addition, the tile map association information can be optionally segmented to further reduce RAM memory requirements. This approach reduces the required amount of RAM memory capacity and the required processing power significantly, thus allowing geofencing also on resource constrained telematics devices.

What is claimed is:

1. An infrastructure for geofencing of vehicles, comprising means for monitoring a vehicle's geographical position;
   means for storing geofence data;
   means for comparing the vehicle's geographical position with said geofence data to determine a geofence violation; and
   means to trigger a predefined action in case of geofence violation;
   said infrastructure being characterized by
   means for defining geographical subregions of the whole area covered by said geofence data;
   means for subdividing said geofence data into sub-geofences matching said geographical subregions and for generating association information associating said sub-geofences to the corresponding geographical subregions;
   a first storage device for keeping all sub-geofence data and association information;
   a second storage device for keeping association information and the sub-geofence data of at least one selected geographical subregion;
   means for locating the vehicle in one of said geographical subregions on the base of the vehicle's geographical position and said definition of geographical subregions; and
   means for restricting the determination of a geofence violation to a comparison of the vehicle's position with the sub-geofence data of the thus identified geographical subregion.

2. The infrastructure according to claim 1, wherein said means for monitoring the vehicle's geographical position comprise a GPS receiver.

3. The infrastructure according to claim 1, wherein an off-line compiler is for defining geographical subregions.

4. The infrastructure according to claim 3, wherein an off-line compiler is provided for subdividing said geofence data into sub-geofences matching said geographical subregions.

5. The infrastructure according to claim 4, wherein an off-line compiler is provided for generating association information associating said sub-geofences to the corresponding geographical subregions.

6. The infrastructure according to claim 5, wherein an off-line compiler is also provided for storing the resulting data structures-sub-geofence data together with association information-on said first storage device.

7. The infrastructure according to claim 1, wherein said first storage device comprises a non volatile memory for storing said sub-geofence data together with said association information.

8. The infrastructure according to claim 1, wherein said second storage device comprises a RAM memory for storing association information and the sub-geofence data of at least one selected geographical subregion.

9. The infrastructure according to claim 1, wherein said first storage device and said second storage device are accessible by a µ-controller
said second storage device for identifying those sub-geofences which are associated with the geographical subregion, where the vehicle has been located,
said first and second storage device for loading said identified sub-geofence data from said first storage device into said second storage device, and
said second storage device for comparing the vehicle's position with the said identified sub-geofence data.

10. A method for geofencing of vehicles, comprising
monitoring of the vehicle's geographical position;
comparing the vehicle's position with geofence data to determine geofence violation; and
triggering a predefined action in case of geofence violation;
said method being characterized by
defining geographical subregions;
subdividing said geofence data into sub-geofences matching said geographical subregions;
generating association information associating said sub-geofences to the corresponding geographical subregions;
locating the vehicle in one of said geographical subregions on the base of the vehicle's geographical position and said definition of geographical subregions; and
restricting the determination of a geofence violation to a comparison of the vehicle's position with the sub-geofence data of the thus identified geographical subregion.

11. The method according to claim 7, wherein said sub-geofence data is associated to the tiles of a tile map representing the subregions of the whole geofence area.

12. The method according to claim 7, wherein once before monitoring the vehicle's position to determine geofence violation all sub-geofence data of the whole area to be observed together with the corresponding association information is stored in a first storage device; and
association information is stored in a second storage device.

13. The method according to claim 8, wherein said tile map association information is grouped according to geographically linked subsets of tiles of said tile map and wherein only a group of association information is loaded into the second storage device depending on the geographical subregion where the vehicle has been located.

14. The method according to claim 9, wherein only the sub-geofence data of that geographical subregion, where the vehicle has been located, is loaded into the second storage device for comparison with the vehicle's position.

* * * * *